United States Patent
Nash

(10) Patent No.: US 11,844,316 B2
(45) Date of Patent: Dec. 19, 2023

(54) METHOD OF PROCESSING BY-PRODUCT WATER FOR OPTIMAL BENEFICIAL USE

(71) Applicant: Marvin Nash, Cheyenne, WY (US)

(72) Inventor: Marvin Nash, Cheyenne, WY (US)

( * ) Notice: Subject to any disclaimer, the term of this patent is extended or adjusted under 35 U.S.C. 154(b) by 0 days.

(21) Appl. No.: 17/821,728

(22) Filed: Aug. 23, 2022

(65) Prior Publication Data

US 2022/0408666 A1    Dec. 29, 2022

Related U.S. Application Data

(63) Continuation of application No. 16/520,252, filed on Jul. 23, 2019, now abandoned.

(60) Provisional application No. 62/737,746, filed on Sep. 27, 2018.

(51) Int. Cl.
*A01G 25/16* (2006.01)
*A01C 21/00* (2006.01)

(52) U.S. Cl.
CPC .......... *A01G 25/167* (2013.01); *A01C 21/007* (2013.01); *G05B 2219/2625* (2013.01)

(58) Field of Classification Search
CPC ...... A01G 25/16; A01G 25/167; A01G 22/00; A01C 21/007; Y02W 10/10; G05B 2219/2625; C02F 1/02; C02F 1/32; C02F 1/441; C02F 3/12; C02F 3/28; G05D 11/00; G05D 11/02; G05D 11/131; G05D 11/135; G05D 11/138; G05D 11/139; Y10T 137/189; Y10T 137/2499; Y10T 137/2509; Y02A 20/00; Y02A 20/146; Y02A 20/148; Y02A 20/20
See application file for complete search history.

(56) References Cited

U.S. PATENT DOCUMENTS 5,207,921 A * 5/1993 Vincent .................... C02F 1/32
                                                              210/708
5,350,527 A * 9/1994 Kitko ................. B01D 17/0208
                                                            210/DIG. 5

(Continued)

FOREIGN PATENT DOCUMENTS

WO    WO 2006/043726 A1 * 4/2006  ................ C02F 9/00
WO    WO 2007/114063 A1 * 10/2007 ................ C02F 3/34

OTHER PUBLICATIONS

WO 2006/043726 A1 (Apr. 2006), machine translation.*
WO 2007/114063 A1 (Oct. 2007), machine translation.*

*Primary Examiner* — M. N. Von Buhr
(74) *Attorney, Agent, or Firm* — Gregory Wood, Esq.

(57) ABSTRACT

A process for batch processing by-product water to obtain a batch of beneficial use water for application to an targeted area of soil with determined moisture and chemical characteristic to change that soil characteristic to a desired soil characteristic includes the steps of measuring the moisture and chemical composition of the targeted area of soil; determining a desired soil characteristic that will grow selected vegetation; defining a chemical composition of a batch water to be applied to the soil to obtain the desired composition; processing a batch of by-product water in accordance with the defined composition; applying the batch of processed water to the targeted area of soil; measuring the moisture and chemical composition of the soil after application; repeating the process until desired composition is achieved or the vegetation growth is completed.

3 Claims, 1 Drawing Sheet

(56) References Cited

U.S. PATENT DOCUMENTS

| | | | | |
|---|---|---|---|---|
| 5,467,271 A * | 11/1995 | Abel | A01B 79/005 | 702/5 |
| 5,647,986 A * | 7/1997 | Nawathe | C02F 3/20 | 210/195.3 |
| 5,927,603 A * | 7/1999 | McNabb | A01G 25/167 | 239/69 |
| 6,840,251 B2 * | 1/2005 | Gill | C02F 1/50 | 134/28 |
| 6,893,567 B1 * | 5/2005 | Vanotti | C02F 1/5245 | 210/906 |
| 7,344,640 B2 * | 3/2008 | Gannon | C02F 9/00 | 210/170.03 |
| 8,580,122 B2 * | 11/2013 | Theodore | C02F 1/66 | 210/720 |
| 9,644,350 B2 * | 5/2017 | Khalifeh | B01D 36/005 | |
| 10,407,332 B2 * | 9/2019 | Prior | C02F 9/00 | |
| 10,578,225 B1 * | 3/2020 | Mayorga | F16K 11/076 | |
| 10,988,394 B2 * | 4/2021 | Häck | G06Q 30/0202 | |
| 11,247,922 B2 * | 2/2022 | Kolstad | C02F 1/72 | |
| 2003/0190742 A1 * | 10/2003 | Whiteman | C02F 3/12 | 435/262.5 |
| 2011/0005284 A1 * | 1/2011 | Conner | C02F 1/307 | 210/243 |
| 2012/0060932 A1 * | 3/2012 | Gutierrez-Wolf | E03B 1/044 | 137/2 |
| 2012/0267318 A1 * | 10/2012 | Hatten | C02F 1/78 | 210/744 |
| 2012/0305468 A1 * | 12/2012 | Sato | B01D 21/286 | 210/295 |
| 2013/0341268 A1 * | 12/2013 | Ertel | C02F 3/305 | 210/151 |
| 2014/0014584 A1 * | 1/2014 | Cone | C02F 9/00 | 210/705 |
| 2014/0027377 A1 * | 1/2014 | Corben | C02F 3/006 | 210/96.1 |
| 2014/0262982 A1 * | 9/2014 | Bailin | C02F 9/00 | 210/201 |
| 2015/0301011 A1 * | 10/2015 | Martinez | G05B 15/02 | 702/2 |
| 2015/0353397 A1 * | 12/2015 | Cath | C02F 3/1268 | 210/253 |
| 2015/0360983 A1 * | 12/2015 | Murkute | C02F 1/42 | 210/194 |
| 2016/0376166 A1 * | 12/2016 | Lawryshyn | C02F 1/32 | 210/709 |
| 2017/0217803 A1 * | 8/2017 | Theodore | C02F 3/302 | |
| 2018/0009681 A1 * | 1/2018 | Cam | B03C 11/00 | |
| 2018/0057379 A1 * | 3/2018 | Upadhyay | C02F 3/327 | |
| 2018/0118589 A1 * | 5/2018 | Kolstad | C02F 1/78 | |
| 2018/0148350 A1 * | 5/2018 | Gao | C02F 9/00 | |
| 2018/0170779 A1 * | 6/2018 | Nickerson | C02F 3/34 | |
| 2018/0297877 A1 * | 10/2018 | Lee | C02F 9/00 | |
| 2018/0354811 A1 * | 12/2018 | Vielma | C02F 1/008 | |

* cited by examiner

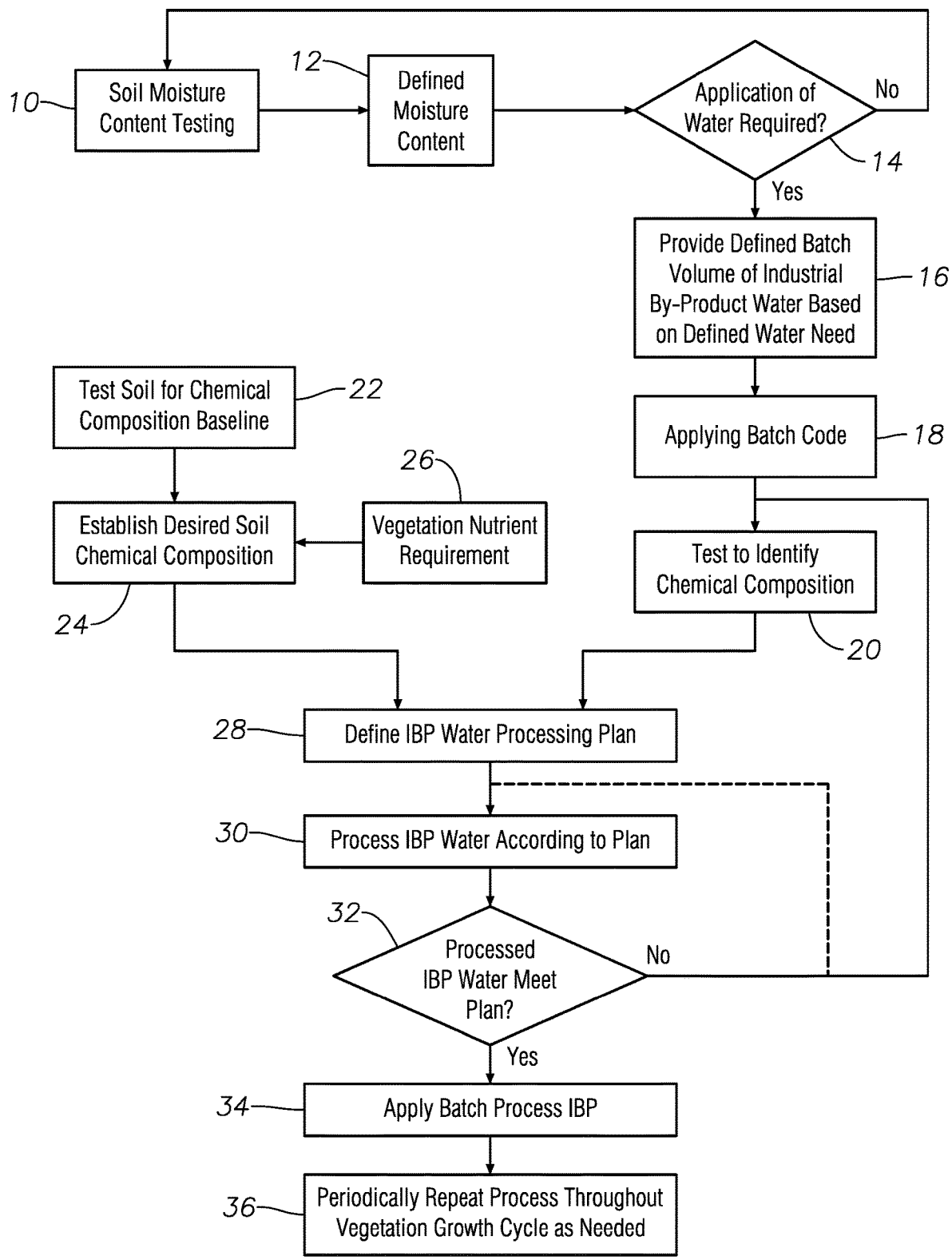

METHOD OF PROCESSING BY-PRODUCT WATER FOR OPTIMAL BENEFICIAL USE

RELATED APPLICATION

This application is a Continuation of U.S. patent application Ser. No. 16/520,252 filed on Jul. 23, 2019 and entitled "Method of Processing Industrial By-Product Water for Optimal Beneficial Use" which claims priority from U.S. Provisional Application No. 62/737,746 filed on Sep. 27, 2018 and entitled "Conservation by Design Beneficial-Use Method," the entire contents of which are hereby fully incorporated herein.

FIELD OF THE INVENTION

This invention relates generally to customized processing of industrial wastewater for beneficial uses such as arid land irrigation for plant cultivation and particularly to a method of processing industrial wastewater according to the determined chemical and moisture characteristics and needs of an area of soil.

DESCRIPTION OF THE RELATED ART

Use of industrial wastewater for various uses are known. For example, US 2003/0200997 recites methods for simultaneously cleaning and disinfecting industrial water; U.S. Pat. No. 5,350,527 describes systems for an oily water separation and water reclamation system; U.S. Pat. No. 5,207,921 describes an industrial wastewater reclamation process; and U.S. Pat. No. 5,467,271 discloses a mapping and analysis system for precision farming applications. However, these and other similar systems focus on removing or purifying industrial waste water to a purity level defined without regard to the specific needs of, for example, the soil to which the processed waste water is to be applied or without considering beneficial to the soil, the plants growing in the soil or even to promotion of carbon dioxide sequestration through plant growth and that it would be therefore better not to remove all such "impurities." Similarly, industrial water purification systems generally do not consider the variation in soil moisture or chemical composition over time or the potential need to adjust or otherwise customize the degree or type of purification of the industrial wastewater based on those factors or on the pre-process composition of the industrial wastewater. In short, existing methods and systems do not adjust the characteristics of water treatment to match the needs of the soil and plants growing in the soil at the time of application of the processed irrigation water. There is therefore a need for a conservation by design ("CBD") process to transform industrial and oil/gas by-product and waste water, for example in arid, oil/gas producing areas, into beneficial-use water for conservation and agricultural applications where the processing of the by-product waste water is designed in response to the composition of the pre-processed industrial wastewater, the needs of the soil based on its chemical and moisture characteristics at the time of water application, the vegetation to be grown on the soil, and any other environmental data and then processing that by-product water and apply it to the soil to obtain predefined and targeted beneficial use industrial waste water.

SUMMARY OF THE INVENTION

The invention is a process which measures the moisture content and the chemical composition of a targeted area of soil, determines a desired moisture content and chemical composition to grow a selected vegetation, defining an amount and chemical composition of a quantity of water to be applied to the area of soil which when applied to the area of soil will cause the area of soil to more closely match the desired moisture content and chemical composition, processing a batch of industrial by-product ("IBP") water in the defined amount to modify the chemical composition that batch of industrial by-product water so that the targeted area of soil will be changed to have moisture content and chemical composition that at approaches the selected moisture and chemical composition when the processed batch of industrial by-product water is applied to the area of soil. The soil may then be tested post application and the process repeated, for example, until the desired moisture content and chemical composition of the soil is reached.

More specifically, the process for applying industrial by-product water to a targeted area of soil for growing selected vegetation includes the steps of measuring the moisture characteristic of the targeted area of soil by using moisture probes or other moisture sensors at one or more locations on the targeted area of soil and obtaining a measure, which may be an average, of the moisture content of the targeted area of soil. A preferred moisture characteristic for the targeted area of soil which may vary depending on the moisture requirements of the vegetation growing on the soil is next selected. Samples of soil over the targeted area of soil are also tested to determine an average chemical characteristic of the targeted area of soil. A desired chemical composition, for example to optimized vegetation growth, is then defined for the targeted area of soil. Using the measured moisture characteristic, the preferred moisture characteristics, the determined chemical characteristic and the desired chemical characteristic information, a composition profile for a defined quantity, that is, a batch of industrial by-product water to be applied to the targeted area of soil is determined. A batch of the industrial by-product water is then processed so that the batch of industrial by-product water will match the composition profile. The batch of water with the composition profile, which may then be considered beneficial-use water, is then applied to the targeted area of soil. The process can then be repeated after application of the first batch of processed industrial by-product water. The repeated process will be based on an adjusted composition profile of a second batch of water which is based on the changes in the measured moisture content and chemical composition of the soil, the needs of the vegetation and any other relevant factors after the application of the first batch of processed industrial by-product water.

As used in this application, "industrial by-product water," also referred to as "produced water" or "industrial wastewater", is water generated from the process of manufacturing, oil drilling, refining, or some other type of product or service. The by-product water is typically mixed with other chemicals and therefore cannot be used for human or animal consumption or for agriculture, nor can it be mixed with ground water or put onto the land without first being purified to remove harmful components. For example, in drilling for crude oil, typically 3 barrels of by-product water come out of the oil well, along with each barrel of oil. Similarly, chemical manufacturing (such as fertilizer or explosives) often creates large volumes of by-product water. Non-manufacturing companies that need to keep either huge warehouses of food product frozen or maintain a cool environment for high-end computer servers will often output large volumes of by-product water that contains chemicals as well.

"Beneficial-use water" is water than has met certain criteria in its makeup (its "DNA") and has been treated to be able to be used for animal consumption, agricultural, or conservation. However, the change of classification from by-product water is only indirectly dependent on the water being cleaned or refined. Rather, the reclassification of industrial by-product water to beneficial-use water is done by the county, state, or federal regulatory bodies that oversee water in a particular geographic region. Obviously, they will only change the classification once the water meets the applicable regulatory specifications, but the processing of the industrial-by-product water does change the classification regardless of whether result obtain regulatory approval.

"Beneficial-use water" is water than has met certain criteria in its makeup (its "DNA") and has been treated to be able to be used for animal consumption, agricultural, or conservation. However, the change of classification from by-product water is only indirectly dependent on the water being cleaned or refined. Rather, the reclassification of industrial by-product water to beneficial-use water is done by the county, state, or federal regulatory bodies that oversee water in a particular geographic region. Obviously, they will only change the classification once the water meets the applicable regulatory specifications, but the processing of the industrial by-product water does change the classification regardless of whether result obtain regulatory approval.

BRIEF DESCRIPTION OF THE DRAWING

The accompanying drawing illustrates the process of the present disclosure of the invention wherein:

FIG. 1 is a block diagram illustrating the process I method of the beneficial use of industrial by-product water.

DETAILED DESCRIPTION

The method/process according to the present disclosure is described in conjunction with reference to FIG. 1 as follows:

Moisture Evaluation: In accordance with the disclosure, a targeted area of soil, preferably near the source of industrial by-product water, is evaluated in block 10 to establish a baseline of soil moisture. This can be accomplished using moisture probes or gauge which can measure the current moisture in the targeted area of soil. The probe, not unlike an automobile oil dipstick, measures how deep from the surface that moisture currently exists. This can range from inches to feet. This metric will change with rain, irrigation, and vegetation use. Thus, the baseline moisture is preferably measured near the time the industrial by-product water is to be applied to the targeted area of soil. The baseline moisture is preferably measured at various selected locations on the targeted area of soil and then averaged or otherwise combined to obtain the baseline moisture for the entire targeted area of soil. The baseline soil moisture is then compared against established agriculture guidelines (block 12) to determine the amount of water that the selected vegetation will need. For example, should the vegetation need 3" of water depth, but there's only currently 1" water depth, then an additional 2" of water will need to be applied through irrigation and the response in block 14 would be yes. If there was no need for additional water at the time of measurement, then the response in block 14 would be no until a later time when testing was once again done to determine the water need.

Soil Testing: In block 22 the soil itself in the targeted area of soil is tested to establish the chemical makeup of the soil. Samples of the soil, collected at multiple representative locations of the targeted area of the soil, are taken to a lab for evaluation to determine the chemical makeup of the soil. Like the water moisture results, the soil test results provide the current chemical composition of the soil at the specific locations where the sample was taken with a composite chemical composition determined by averaging or otherwise combining the according to any other accepted combining technique to obtain a composite chemical composition measure. A desired chemical/nutrient composition of the targeted soil area is then established in block 24 based at least in part on the nutrient requirements of the vegetation to be grown (block 26). The chemical composition of the soil, the requirements of the vegetation to be grown and a selected or desired optimum chemical/nutrient composition of the soil along with the measured chemical composition of the industrial by-product water (block 20) is then used to define how a batch of the industrial by-product water should be processed to remove, add or modify its chemical composition to achieve the desired chemical/nutrient composition for the soil (block 28) when the processed industrial by product water is applied to the targeted soil area. For example, if the soil is deficient in nitrogen, the processing of the industrial by-product water (block 30) can be done in a way that will leave more nitrogen in the water. If the soil has an abundance of nitrogen, the processing plan (block 28) will be defined so that the industrial by-product water processing (block 30) will remove nitrogen from the water, so as not to have too much. The determination of the proper amount of chemicals that should be in the batch industrial by-product water is referred to as Conservation by Design ("CBD") and is designed so that the measured soil characteristics are used to determine the makeup of the processed industrial by-product water that is to be applied to the targeted area soil.

Industrial By-Product Water Processing: The industrial by-product water is first put into a batch holding tank (block 16) with a defined volume and preferably located near the industrial-by-product water source. In one example, the batch holding tank holds 21,000 gallons (500 barrels). Depending on the volume of industrial by-product water and the acreage to which the process water is to be applied, more than one such batch holding tank may be utilized. From an agricultural perspective, each tank can water an acre of soil approximately one inch deep. Each batch is then identified with a tracking code (block 18) so that should any problems arise with the water's makeup, it is simple to identify which batch is problematic and that batch can be re-processed (e.g., block 32).

Industrial By-Product Water Pre-Test: Once the chemical makeup of the soil is known, a selected chemical make-up for the processed industrial by-product water to be applied to the targeted soil can be selected to adjust the chemical makeup of the soil to be closer to an ideal makeup for the vegetation to be grown. Referring to the previous example, if the soil needs more-or-less nitrogen for ideal growing conditions, the processing of the industrial by-product water will be adjusted to increase or decrease the nitrogen to provide more or less nitrogen to the soil. With an ideal water makeup in mind, the batched water is tested (block 20) to see how close it comes to this ideal. The processing plan (block 28) is then created based on comparing what the industrial by-product water is currently to approximately what is needed for the area of soil (with its current chemical/nutrient composition and the needs of the vegetation to be grown) to more closely align with the defined or desired post-application moisture and chemical composition. In addition to monitoring the potentially "good" chemicals in the industrial by-product water, the "bad" chemicals, such as chlorine, are also identified and their removal is part of the water processing plan. The industrial by-product water is then processed in accordance with the processing plan (block 30). A pre-treatment report of chemical composition of the batch of industrial by-product water is illustrated below.

LABORATORY ANALYTICAL REPORT
Prepared by Casper, WY Branch

| Client: | | Report Date: | Jun. 20, 2018 |
|---|---|---|---|
| Project: | Not Indicated | Collection Date: | Jun. 14, 2018 09:30 |
| Lab ID: | C18060621-001 | Date Received: | Jun. 15, 2018 |
| Client Sample ID: | Pre-Treatment Tank H1903 | Matrix: | Aqueous |

| Analysis | Results/Units | Qualifiers | RL | MCL QCL | Method | Analysis Date/By |
|---|---|---|---|---|---|---|
| MAJOR IONS | | | | | | |
| Alkalinity, Total as CaCO3 | 459 mg/L | | 5 | | A2320 B | Jun. 11, 2018 18:32/ljl |
| Carbonate as CO3 | ND mg/L | | 5 | | A2320 B | Jun. 19, 2018 18:32/ljl |
| Bicarbonate as HCO3 | 560 mg/L | | 5 | | A2320 B | Jun. 19, 2018 18:32/ljl |
| Chloride | 45600 mg/L | D | 50 | | E300.0 | Jun. 18, 2018 18:56/ljl |
| Sulfate | 389 mg/L | D | 200 | | E300.0 | Jun. 18, 2018 18:56/ljl |
| PHYSICAL PROPERITES | | | | | | |
| Conductivity @25° C. | 92900 umhos/cm | E | 5 | | A2510B | Jun. 18, 2018 11:27/ljl |
| pH | 7.17 s.u. | H | 0.01 | | A4500 HB | Jun. 18, 2018 11:27/ljl |
| pH Measurement Temp | 16° C. | | | | A4500 HB | Jun. 18, 2018 11:27/ljl |
| Solids, Total Dissolved TDS @180° C. | 82400 mg/L | D | 1000 | | A2540 C | Jun. 18, 2018 09:51/mvr |
| NUTRIENTS | | | | | | |
| Nitrogen, Nitrate as N | ND mg/L | | 0.01 | | A4500-NO2 B | |
| Nitrogen, Nitrate + Nitrate as N | 0.07 mg/L | | 0.01 | | E353.2 | |
| Nitrogen, Ammonia as N | 69 mg/L | D | 5 | | A450-NH3 G | |
| VOLATILE ORGANIC COMPOUNDS | | | | | | |
| Benzene | 170 ug/L | | 10 | | SW8260B | Jun. 20, 2018 02:08/dm |
| Ethylbenzene | 3.8 ug/L | | 10 | | SW8260B | Jun. 20, 2018 02:08/dm |
| m + p-Xylenes | 4.2 ug/L | | 10 | | SW8260B | Jun. 20, 2018 02:08/dm |
| o-Xylene | 24 ug/L | | 10 | | SW8260B | Jun. 20, 2018 02:08/dm |
| Toluene | 90 ug/L | | 10 | | SW8260B | Jun. 20, 2018 02:08/dm |
| Xylenes, Total | 66 ug/L | | 10 | | SW8260B | Jun. 20, 2018 02:08/dm |
| Surr. 1,2-Dichloreathane - d4 | 88.0% REC | | 70-130 | | SW8260B | Jun. 20, 2018 02:08/dm |
| Surr. Dibromofluormethane | 93.0% REC | | 70-130 | | SW8260B | Jun. 20, 2018 02:08/dm |
| Surr. p-Bromofluorobenzene | 111% REC | | 70-130 | | SW8260B | Jun. 20, 2018 02:08/dm |
| Surr. Toluene-dB | 101% REC | | 70-130 | | SW8260B | Jun. 20, 2018 02.08/dm |

The reporting limit reflects a 20 times dilution. The sample was diluted due to foaming.

Report Definitions:

RL—Analyte reporting limit.

QCL—Quality control limit.

D-RL increased due to sample matrix.

MCL—Maximum contaminant level.

ND—Not detected at the reporting limit.

E—Estimated value. Result exceed the instrument upper quantitation limit.

J—Estimated value. The analyte was present but less than the reporting limit.

Industrial By-Product Water Processing: The industrial by-product water is processed (block 30) using a range of available technology units preferably located close to the source of the by-product water eliminating the need to truck or pipe the water to a processing facility. Two methods of processing the industrial by-product water can be used and are ideal for CBD. Water can be processed by heating such that industrial by-product water is heated to differing temperatures to eliminate certain chemicals. Alternatively, the industrial by-product processing can be by reverse osmosis to select some and eliminate other chemicals. Other means of process are also available such as filtering, UV radiation, aerobic processing, anoxic processing, anaerobic processing or any other cleaning process. The industrial by-product water processing plan is then used to process the industrial by-product water into a second batch holding tank.

Water Post-Test: After the process industrial by-product water has been processed into the second batch holding bin, it is tested (block 32) to ensure that the processing is in accordance with the processing plan and the resultant processed water meets processing plan specifications. If not, the processes water is run through one or more processing step(s) again. This can be done by adjusting the processing plan based on the chemical composition of the processed water determined from the test (either in block 32 or block 20, as shown in FIG. 1) or by simply using the same processing plan to reprocess the water as shown by the dashed line in FIG. 1. A typical post processing test report is illustrated as follows:

LABORATORY ANALYTICAL REPORT
Prepared by Casper, WY Branch

| Client: | Encore Green | Report Date: | Jun. 20, 2018 |
|---|---|---|---|
| Project: | Not Indicated | Collection Date: | Jun. 15, 2018 13:00 |
| Lab ID: | C18060621-002 | Date Received: | Jun. 15, 2018 |
| Client Sample ID: | Post-Treatment Tank H903 | Matrix: | Aqueous |

| Analysis | Results/Units | Qualifiers | RL | MCL QCL | Method | Analysis Date/By |
|---|---|---|---|---|---|---|
| MAJOR IONS | | | | | | |
| Alkalinity, Total as CaCO3 | 246 mg/L | | 5 | | A2320 B | Jun. 19, 2018 18:59/ljl |
| Carbonate as CO3 | ND mg/L | | 5 | | A2320 B | Jun. 19, 2018 18:59/ljl |
| Bicarbonate as HCO3 | 300 mg/L | | 5 | | A2320 B | Jun. 19, 2018 18:59/ljl |
| Chloride | 25 mg/L | | | | E300.0 | Jun. 18, 2018 19:14/ljl |
| Sulfate | 42 mg/L | | | | E300.0 | Jun. 18, 2018 19:14/ljl |
| PHYSICAL PROPERTIES | | | | | | |
| Conductivity @25° C. | 688 umhos/cm | | 5 | | A2510B | Jun. 18, 2018 11:29/ljl |
| pH | 7.78 s.u. | H | 0.01 | | A4500 HB | Jun. 18, 2018 11:29/ljl |
| pH Measurement Temp | 17° C. | | | | A4500 HB | Jun. 18, 2018 11:29/ljl |
| NUTRIENTS | | | | | | |
| Nitrogen, Nitrate as N | 0.06 mg/L | D | 0.05 | | A4500-NO2 B | Jun. 15, 2018 17:43/dmb |
| Nitrogen, Nitrate + Nitrate as N | 5.00 mg/L | D | 0.05 | | E353.2 | Jun. 19, 2018 14:44/dmb |
| Nitrogen, Ammonia as N | 9.8 mg/L | D | 0.2 | | A450-NH3 G | Jun. 18, 2018 14:25/dmb |
| VOLATILE ORGANIC COMPOUNDS | | | | | | |
| Benzene | 1050 ug/L | | | 50 | SW8260B | Jun. 20, 2018 02:41/dm |
| Ethylbenzene | 2.9 ug/L | | | 1.0 | SW8260B | Jun. 19, 2018 05:49/dm |
| m + p-Xylenes | 3.2 ug/L | | | 1.0 | SW8260B | Jun. 19, 2018 05:49/dm |
| o-Xylene | 3.2 ug/L | | | 1.0 | SW8260B | Jun. 19, 2018 05:49/dm |
| Toluene | 59 ug/L | | | 50 | SW8260B | Jun. 20, 2018 02:41/dm |
| Xylenes, Total | 6.3 ug/L | | | 1.0 | SW8260B | Jun. 19, 2018 05:49/dm |
| Surr. 1,2-Dichloreathane - d4 | 97.0% REC | | | 70-130 | SW8260B | Jun. 20, 2018 02:41/dm |
| Surr. Dibromofluormethane | 104% REC | | | 70-130 | SW8260B | Jun. 19, 2018 05:49/dm |
| Surr. p-Bromofluorobenzene | 101% REC | | | 70-130 | SW8260B | Jun. 19, 2018 05:49/dm |
| Surr. Toluene-dB | 98.0% REC | | | 70-130 | SW8260B | Jun. 19, 2018 05:49/dm |

Report Definitions:

RL—Analyte reporting limit.

QCL—Quality control limit.

D-RL increased due to sample matrix.

MCL—Maximum contaminant level.

ND—Not detected at the reporting limit.

H—Analysis performed past recommended holding time.

Water Application: The processed industrial by-product water is then applied (block 34) to the select area of soil using well known agricultural irrigation technique.

Ongoing Monitoring: Since the processed industrial by-product water application will in most cased be repeated for growing the crops, trees, or other vegetation, the moisture and chemical composition testing of the targeted area of soil will be periodically repeated (block 36) with appropriate modifications to ensure that the correct amount of water with the correct chemical/nutrient composition will be applied. Based on the vegetation being grown, the soil is also periodically monitored to reveal if the processing plan needs to be adjusted. An illustration of a monitoring report of the chemical composition is as follows:

carbon dioxide in the ground. Likewise, any carbon remaining in the process industrial by-product water will also be absorbed into the ground rather than released into the atmosphere. Accordingly, the scope of the invention is to be interpreted only in conjunction with the appended claims.

The invention claimed is:

1. A method for processing a selected volume of by-product water and uniformly applying the volume of processed by-product water to a selected acreage of land, comprising the steps of:

a. Measuring the moisture of the targeted acreage of land at selected locations and defining from said measures a pre-application moisture characteristic for the selected acreage;

LABORATORY ANALYTICAL REPORT
Prepared by Casper, WY Branch

| Client: | Encore Green | Report Date: | Jun. 20, 2018 |
|---|---|---|---|
| Project: | Not Indicated | Collection Date: | Jun. 15, 2018 13:00 |
| Lab ID: | C18060621-002 | Date Received: | Jun. 15, 2018 |
| Client Sample ID: | Post-Treatment Tank H903 | Matrix: | Aqueous |

| Analysis | Results/Units | Qualifiers | RL | MCL QCL | Method | Analysis Date/By |
|---|---|---|---|---|---|---|
| MAJOR IONS | | | | | | |
| Alkalinity, Total as CaCO3 | 246 mg/L | | 5 | | A2320 B | Jun. 19, 2018 18:59/ljl |
| Carbonate as CO3 | ND mg/L | | 5 | | A2320 B | Jun. 19, 2018 18:59/ljl |
| Bicarbonate as HCO3 | 300 mg/L | | 5 | | A2320 B | Jun. 19, 2018 18:59/ljl |
| Chloride | 25 mg/L | | | | E300.0 | Jun. 18, 2018 19:14/ljl |
| Sulfate | 42 mg/L | | | | E300.0 | Jun. 18, 2018 19:14/ljl |
| PHYSICAL PROPERTIES | | | | | | |
| Conductivity @25° C. | 688 umhos/cm | | 5 | | A2510B | Jun. 18, 2018 11:29/ljl |
| pH | 7.78 s.u. | H | 0.01 | | A4500 HB | Jun. 18, 2018 11:29/ljl |
| pH Measurement Temp | 17° C. | | | | A4500 HB | Jun. 18, 2018 11:29/ljl |
| NUTRIENTS | | | | | | |
| Nitrogen, Nitrate as N | 0.06 mg/L | D | 0.05 | | A4500-NO2 B | Jun. 15, 2018 17:43/dmb |
| Nitrogen, Nitrate + Nitrate as N | 5.00 mg/L | D | 0.05 | | E353.2 | Jun. 19, 2018 14:44/dmb |
| Nitrogen, Ammonia as N | 9.8 mg/L | D | 0.2 | | A450-NH3 G | Jun. 18, 2018 14:24/dmb |
| VOLATILE ORGANIC COMPOUNDS | | | | | | |
| Benzene | 1050 ug/L | | 50 | | SW8260B | Jun. 20, 2018 02:41/dm |
| Ethylbenzene | 2.9 ug/L | | 1.0 | | SW8260B | Jun. 19, 2018 05:49/dm |
| m + p-Xylenes | 3.2 ug/L | | 1.0 | | SW8260B | Jun. 19, 2018 05:49/dm |
| o-Xylene | 3.2 ug/L | | 1.0 | | SW8260B | Jun. 19, 2018 05:49/dm |
| Toluene | 59 ug/L | | 50 | | SW8260B | Jun. 20, 2018 02:41/dm |
| Xylenes, Total | 6.3 ug/L | | 1.0 | | SW8260B | Jun. 19, 2018 05:49/dm |
| Surr. 1,2-Dichloreathane - d4 | 97.0% REC | | 70-130 | | SW8260B | Jun. 20, 2018 02:41/dm |
| Surr. Dibromofluoromethane | 104% REC | | 70-130 | | SW8260B | Jun. 19, 2018 05:49/dm |
| Surr. p-Bromofluorobenzene | 101% REC | | 70-130 | | SW8260B | Jun. 19, 2018 05:49/dm |
| Surr. Toluene-dB | 98.0% REC | | 70-130 | | SW8260B | Jun. 19, 2018 05:49/dm |

Report Definitions:
RL—Analyte reporting limit.
QCL—Quality control limit.
D-RL increased due to sample matrix.
MCL—Maximum contaminant level.
ND—Not detected at the reporting limit.
H—Analysis performed past recommended holding time.

While the invention has been described with reference to at least one preferred embodiment, it is to be clearly understood by those skilled in the art that the invention is not limited thereto. For example, the above disclosure has application to carbon sequestration for preserving the environment. In such an application, the processed industrial by-product water generated in arid areas can be applied to large areas of arid soil where vegetation is sparse or non-existent to water vegetation which will have the effect of removing carbon dioxide from the atmosphere and through the process of plant growth and will in effect deposit the b. Selecting a desired post-application moisture characteristic for selected acreage;

c. Comparing the uniform pre-application moisture characteristic against the selected post-application moisture characteristic to define a volume of moisture for being applied to the selected acreage to approximate the selected post-application moisture characteristic for the selected acreage, the defined volume of moisture being substantially equal to the volume of by-product water selected for being processed;

d. Sampling the chemical composition of the selected acreage to define a composite pre-application chemical composition for the selected acreage;

e. Selecting a preferred post-application chemical composition for the selected acreage;

f. Comparing the composite pre-application chemical composition against the selected post-application chemical composition and from such comparison defining a composition profile for the volume of by-product water to be applied to the and selected acreage;

g. Processing the selected volume of by-product water as a batch in accordance with the composition profile to define a batch of processed by-product water; and h. Applying the batch of processed by-product water uniformly over the selected acreage to achieve a post-application chemical composition for the selected acreage that approximates the selected post-application chemical composition for the acreage.

2. The method of claim 1 wherein the step of processing the selected volume of by-product water in accordance with the composition profile includes at least one of the sub-steps of thermal processing, reverse osmosis, filtering, ultraviolet radiation, aerobic processing, anoxic processing, and anaerobic processing.

3. The method of claim 1 further comprising a first processing of the batch of by-product water into a holding bin, testing the by-product water to determine if the processed water in the holding bin meets the composition profile and selectively repeating steps d-g until the processed batch of by-product water meets the composition profile.

* * * * *